(12) United States Patent
Rossi

(10) Patent No.: US 8,844,808 B2
(45) Date of Patent: Sep. 30, 2014

(54) CASH TILL LOAD CELL

(75) Inventor: Anthony Augustus Rossi, London (GB)

(73) Assignee: Cash Bases Limited et al, East Sussex (GB)

(*) Notice: Subject to any disclaimer, the term of this patent is extended or adjusted under 35 U.S.C. 154(b) by 0 days.

(21) Appl. No.: 13/877,596

(22) PCT Filed: Oct. 3, 2011

(86) PCT No.: PCT/GB2011/001439
§ 371 (c)(1),
(2), (4) Date: Jun. 25, 2013

(87) PCT Pub. No.: WO2012/045993
PCT Pub. Date: Apr. 12, 2012

(65) Prior Publication Data
US 2013/0264916 A1    Oct. 10, 2013

(30) Foreign Application Priority Data
Oct. 5, 2010  (GB) .................................. 1016787.2

(51) Int. Cl.
G06Q 40/00   (2012.01)
G07D 11/00   (2006.01)
G07F 19/00   (2006.01)
G01G 9/00    (2006.01)
G07G 1/00    (2006.01)
A47B 81/00   (2006.01)
G01G 19/42   (2006.01)

(52) U.S. Cl.
CPC ....... *A47B 81/00* (2013.01); *G01G 9/00* (2013.01); *G07G 1/0027* (2013.01); *G01G 19/42* (2013.01)
USPC .............................. 235/379; 235/375; 235/487

(58) Field of Classification Search
USPC ................ 235/379, 375, 487; 705/16, 21
See application file for complete search history.

(56) References Cited

U.S. PATENT DOCUMENTS 3,869,005 A   3/1975   Williams, Jr. et al.
4,328,874 A   5/1982   Gumberich
(Continued)

FOREIGN PATENT DOCUMENTS

EP   0724242   7/1996
GB   2407172   4/2005
(Continued)

OTHER PUBLICATIONS

"Detecting Current Outliers: Continuous Outlier Detection over Time-Series Data Streams" by Ishida dated 2008 http://www.tulips.tsukuba.ac.jp/dspace/bitstream/2241/106312/1/LNCS 5181.pdf.

(Continued)

*Primary Examiner* — Edwyn Labaze

(57) ABSTRACT

A cash till having a drawer (2) with a plurality of compartments (4) for storing coins, notes or vouchers. Each compartment (4) has an associated load cell (6), which produces a signal that is proportional to the weight of the compartment contents. The signal is provided to a monitoring apparatus (10) that takes readings from the load cell (6) while the till drawer (2) is closed. If a preceding reading is within a threshold amount of the current reading, then the preceding reading is stored as a verified value. The method removes jitter and drift in the signals produced by the load cells (6) of the cash till.

15 Claims, 4 Drawing Sheets

(56) References Cited

U.S. PATENT DOCUMENTS

| | | | |
|---|---|---|---|
| 4,522,275 A * | 6/1985 | Anderson | 177/25.13 |
| 4,760,539 A | 7/1988 | Amacher et al. | |
| 4,791,592 A | 12/1988 | Burgess | |
| 5,227,966 A | 7/1993 | Ichiba | |
| 5,756,977 A | 5/1998 | Biss | |
| 2008/0188169 A1 | 8/2008 | Hibari et al. | |
| 2009/0014510 A1 * | 1/2009 | Cox et al. | 235/23 |
| 2009/0222359 A1 | 9/2009 | Henry et al. | |
| 2009/0236431 A1 | 9/2009 | Benigno et al. | |
| 2010/0228522 A1 | 9/2010 | Hamamoto | |
| 2011/0295741 A1 * | 12/2011 | Sugitani et al. | 705/39 |

FOREIGN PATENT DOCUMENTS

| | | |
|---|---|---|
| GB | 2410363 | 7/2005 |
| GB | 2417093 | 2/2006 |
| WO | 2005038732 | 4/2005 |
| WO | 2007128572 | 11/2007 |
| WO | 2008035087 | 3/2008 |

OTHER PUBLICATIONS

Cirrus Logic document "optimizing the Performance of CS553x ADCs" dated Sep. 2006.

EP search report for EP 11773509.2 dated Mar. 20, 2014.

* cited by examiner

CASH TILL LOAD CELL

This patent applications claims priority to PCT Patent Application No. PCT/GB2011/001439 filed Oct. 3, 2011, which claims priority to Great Britain Patent Application No. 1016787.2 filed Oct. 5, 2010, the disclosures of which are herein incorporated by reference.

FIELD OF THE INVENTION

The present invention relates to reading data from a load cell of a cash till and monitoring cash till transactions.

BACKGROUND

Cash tills are used to store coins, notes and vouchers (e.g. coupons, chips or tokens) received by a retailer in exchange for goods or services. Some cash tills also have means for monitoring the transactions that are made using the till, and can provide the retailer with information regarding the total amount of cash that should be in the till. The retailer can use this information to make a comparison between the amount of cash that should be in the till and the amount of cash that is actually in the till. The retailer can, therefore, be made aware if there is a shortfall in the amount of cash in the till, which may indicate, for example, that a mistake has been made by a cashier or a that theft has taken place.

Traditionally, the amount of cash in a till was counted manually or using a separate cash counting machine. More recently, cash tills have been developed that have load cells for weighing the respective compartments within the cash till.

In these cash tills, each compartment is associated with a specific denomination of coin or note, or with a specific type of voucher. A load cell is used to determine the weight of the compartment to which it relates, and can provide a signal to a monitoring apparatus which can determine the amount of cash in the compartment based on the weight of that compartment. These tills are useful in that they provided a way to monitor the amount of cash in the till without the need to remove the cash from the till. These tills, however, have a number of drawbacks.

For example, load cells tend to suffer from random fluctuations or "jitter" in the signals that they output. Load cells can also suffer from a gradual increase or decrease or "drift" in the signals that they output over time. These effects can lead to incorrect calculations in the weight on the load cell, and consequently an incorrect determination of the amount of cash in the compartment to which the load cell relates.

Furthermore, a given compartment is not aware of the specific denomination of coin or note, or the type of voucher that it has received. Therefore, if a coin of one denomination (or some other object) is placed in a compartment that relates to a different denomination of coin, the monitoring apparatus is unaware that this has happened and an incorrect determination of the amount of cash in that compartment will be made due to the different weights of the different denominations.

Accordingly, the Applicants believe that there remains scope for improvements in taking readings from load cells and in monitoring cash till transactions.

SUMMARY

According to an aspect of the present invention there is provided a method of reading data from a load cell of a cash till comprising taking a plurality of readings successively from the load cell, comparing a given reading with a subsequently taken reading, and storing the given reading in memory as a verified value if the subsequently taken reading differs by less than a predetermined amount from the given reading.

The present invention is advantageous in that it stores a reading as a verified value if that reading is within a predetermined amount of the subsequent reading, e.g. when the amount of jitter in the output of the load cell between readings is below a predetermined amount. The verified "good" reading can then be used to determine the weight on the load cell. However, a "bad" reading that is different from the subsequent reading by more than a predetermined amount, for example due to excessive jitter in the output of the load cell, will not be stored and consequently will not be used to determine the weight on the load cell.

The method preferably comprises storing the subsequently taken reading in memory as the given reading after the comparison, comparing the given reading with a subsequently taken reading, and storing the given reading in memory as a verified value if the subsequently taken reading differs by less than a predetermined amount from the given reading.

The method preferably comprises continuing to take successive readings from the load cell and to perform comparisons until a predetermined number of verified values has been stored in memory. In a preferred embodiment the predetermined number is 5 or more. The method of the present invention preferably comprises calculating an average value for the predetermined number of verified values, and storing the average value in memory. The average value is preferably a mean average.

These embodiments of the present invention are advantageous in that they further reduce the effects of jitter and can account for the effects of drift by considering a plurality of verified values over time.

In a preferred embodiment the average value is calculated a plurality of times, with the most recent average value being retained in memory. The plurality of times are preferably separated from one another by an interval of 20 seconds or longer.

These embodiments of the present invention are advantageous in that they reduce the effects of drift in the output of the load cell by considering only the most recent average value.

The method of the present invention is preferably performed while the drawer of the cash till remains closed.

The Applicants have identified that a greater amount of jitter can occur whilst a till drawer is open and in use, and that cash transactions may only be partially complete whilst the till drawer is open. The Applicants have further identified that computational resources can be saved by only taking readings from a load cell of a cash till while the cash till drawer remains closed. Indeed, the Applicant believe that these features of the present invention are new and advantageous in their own right.

Thus, according to another aspect of the present invention there is provided a method of monitoring cash till transactions, comprising taking one or more readings from a load cell of the cash till while the drawer of the cash till is in a closed state, storing a first load cell value which is derived from the one or more load cell readings in memory, identifying that the drawer of the cash till has been opened and subsequently closed, taking one or more subsequent readings from the load cell of the cash till responsive to the drawer of the cash till being closed and while the drawer of the cash till is in the closed state, storing a second load cell value which is derived from the one or more subsequent load cell readings in memory, and determining a difference in the load on the load cell using the first and second stored values.

In embodiments of the present invention the first value and/or the second value is a verified value obtained as set out above. However, in more preferred embodiments the first value and/or the second value is an averaged value obtained as set out above.

In the method of the present invention the load cell preferably relates to a compartment in the cash till for a specific coin, note or voucher, and the method comprises determining a change in the number of coins, notes or vouchers in the compartment from the difference in the load on the load cell, and adding the change in the number of coins, notes or vouchers to a quantity stack for the compartment.

The method of the present invention preferably comprises determining the change in the number of coins, notes or vouchers in the compartment by dividing the difference between the second and first stored values by a load cell weight factor attributed to the specific coin, note or voucher.

The division preferably results in a number consisting of an integer plus a fraction of the specific coin, note or voucher, and the change in the number of coins, notes or vouchers is preferably determined to be, if the fraction is less than a first threshold value, the integer, or, if the fraction is greater than the first threshold value, the integer plus one.

In a preferred embodiment, if the fraction is less than the first threshold value, but greater than a second threshold value, then the fraction is added to an error stack as an error fraction.

The method preferably comprises removing the error fraction from the error stack if the error fraction, when added to the result of the division, would give an integer plus a fraction where the fraction is greater than the first threshold value or the fraction is less than the second threshold value, and determining that the change in the number of coins, notes or vouchers is, if the fraction is less than the second threshold value, the integer, or, if the fraction is greater than the first threshold value, the integer plus one.

These embodiments of the present invention are advantageous in that they can account for the situation where an incorrect denomination of coin, note or other object is placed in a compartment of the till.

The method of the present invention preferably comprises comparing the monetary value of the change in the number of coins, notes or vouchers to the monetary value of any till transactions that have occurred between the one or more readings and the subsequent one or more readings, and providing an alert if the monetary value of the change in the number of coins, notes or vouchers differs from the monetary value of the till transactions by more than a threshold amount.

These embodiments of the present invention can be use to detect and alert a retailer to a shortfall in the amount of cash in the till.

The method of the present invention preferably comprises comparing the value stored in the quantity stack to a threshold amount, and providing an alert if the value is less than the threshold amount.

These embodiments of the present invention can be use to detect and alert a retailer to there being insufficient float in the till.

The present invention also extends to a cash till and an apparatus arranged to carry out the above methods.

Thus, according to another aspect of the present invention there is provided a cash till comprising a till drawer having a plurality of compartments for holding coins, notes or vouchers, with at least one of the compartments having a load cell for weighing that compartment, means for determining when the till drawer has been closed, and an apparatus for monitoring the transactions of the cash till comprising means arranged to carry out the methods of the present invention as set out above.

According to another aspect of the present invention there is provided an apparatus for monitoring the transactions of a cash till, the apparatus comprising means adapted to carry out the methods of the present invention as set out above.

In some embodiments, all or part of the apparatus forms part of the cash till and is, for example, a data processing means within the cash till. In some embodiments, all or part of the apparatus is remote from, but is communicably coupled with, the cash till and is, for example, a computer system (e.g. a server) comprising data processing means. In some embodiments, the apparatus is communicably coupled with a plurality of cash tills and is arranged to monitor the transactions of the plurality of cash tills.

The methods in accordance with the present invention may be implemented at least partially using computer programs or software code portions.

Thus, according to another aspect of the present invention there is provided a computer program comprising code for performing the method of the present invention as set out above when run on a data processing means.

According to another aspect of the present invention there is provided a computer readable medium storing software code portions for performing the method of the present invention as set out above when run on a data processing means.

The computer readable medium may comprise a non-transitory medium, such as a CD or other optical disk, a diskette, or a hard disk, or may comprise a transitory medium such as an electronic or optical signal transmittable to a computer system, via a modem or other interface device, over either a tangible medium, including but not limited to optical or analogue communications lines, or intangibly using wireless techniques, including but not limited to microwave, infrared or other transmission techniques.

FIGURES

Preferred embodiments of the present invention will now be described by way of example only and with reference to the accompanying drawings in which.

DETAILED DESCRIPTION

Figure 1:
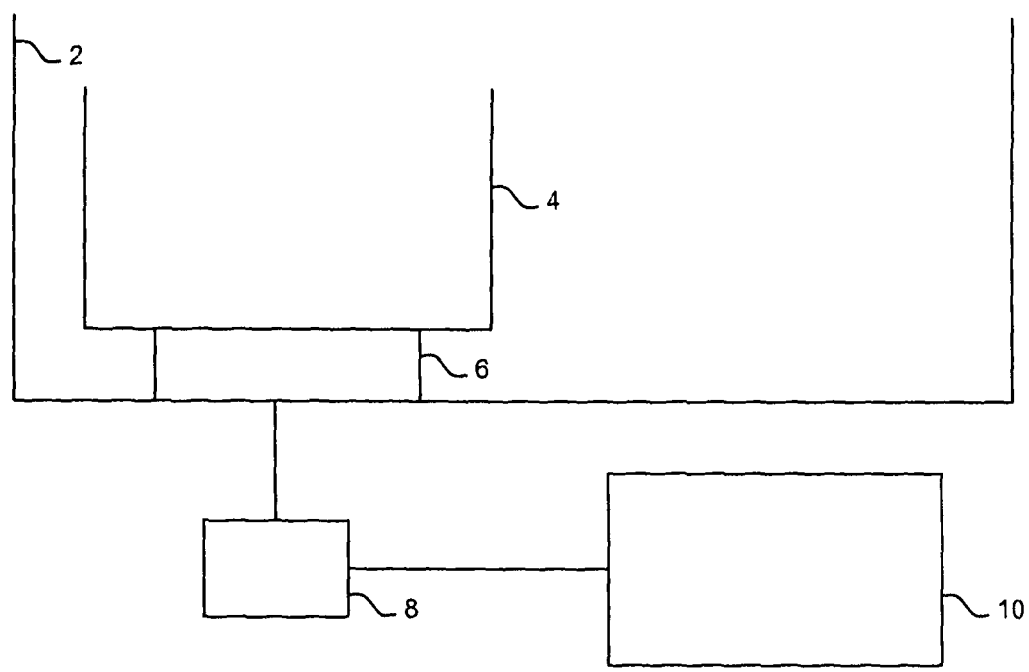
FIG. 1 is schematic drawing of a cash till drawer in accordance with an embodiment of the present invention.

FIG. 1 is schematic drawing of a drawer 2 of a cash till. The drawer 2 contains a plurality of compartments 4 (only one shown) for storing coins, notes or vouchers, with each compartment 4 having an associated load cell 6.

The load cell 6 for each compartment 4 produces an analogue signal that is proportional to the weight of the compartment contents. The analogue signal is provided to an analogue to digital converter (ADC) 8 that outputs a digital signal for the load cell 6 to a monitoring apparatus 10.

Each compartment 4 is associated with a specific denomination of coin or note, or with a specific type of voucher within the monitoring apparatus 10. The weight of one of the coins, notes or vouchers, in terms of the change in the digital signal caused by adding one of the coins, notes or vouchers to the compartment 4, is also known to the monitoring apparatus 10. The monitoring apparatus 10 is therefore able to determine any change in the number of coins, notes or vouchers in a compartment 4 from the change in the reading from the load cell 6 associated with that compartment 4.

For example, a compartment 4 may be associated with pound coins, and the known change in the reading when £1 is added to the compartment 4 may be 100. If the change in the reading for the compartment 4 for pound coins is 200, then the monitoring apparatus 10 determines that £2 has been added to that compartment 4.

Figure 2:
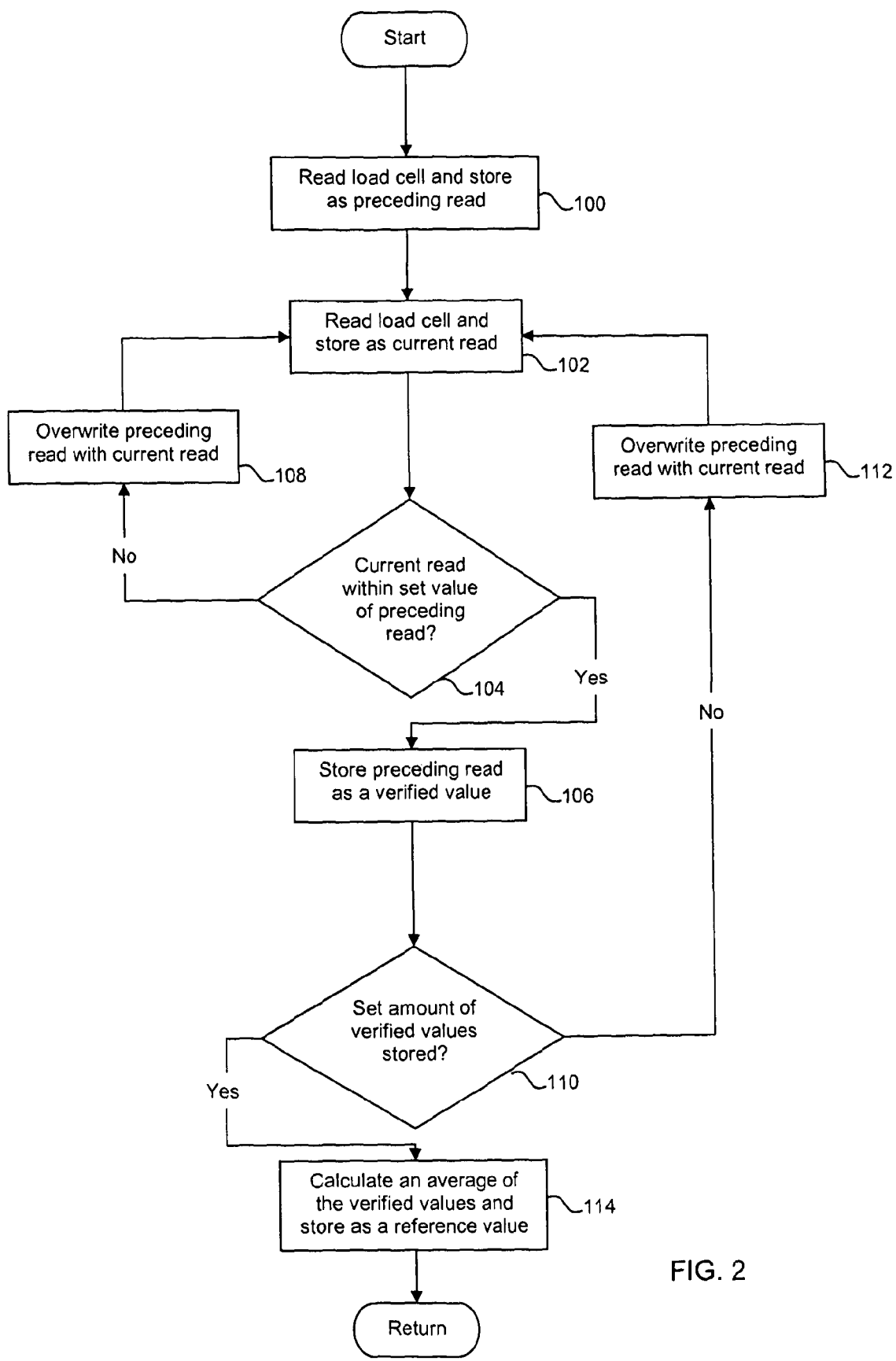
FIG. 2 is a flow diagram illustrating a method of determining a reference reading for a load cell of a cash till in accordance with an embodiment of the present invention.

FIG. 2 illustrates a method of determining a reference reading for a load cell in a cash till. The method begins by the monitoring apparatus taking a first reading from the ADC of the load cell. The first reading is temporarily stored in the memory of the monitoring apparatus as a "preceding" reading (step 100).

A second reading is then taken from the ADC of the load cell, and the second reading is temporarily stored in the memory as a "current" reading (step 102).

The difference between the preceding reading and the current reading is then compared to a threshold amount (step 104). This threshold amount may be reconfigurable within the monitoring apparatus, and may be based on the degree of jitter that the monitoring apparatus is required to remove from the ADC signal.

If the current reading differs from the preceding reading by less than a threshold amount, then the preceding reading is stored in memory as a verified reading (step 106).

If the current reading differs from the preceding reading by more than a threshold amount, then the current reading is used to overwrite the preceding reading in memory (step 108). A third reading is then taken from the ADC of the load cell, and is stored as the current reading (step 102). The preceding reading and the current reading are then compared again (step 104).

The process of steps 102, 104 and 108 continues until the current reading differs from the preceding reading by less than a threshold amount and the preceding reading is stored in memory as a verified reading (step 106).

A determination is then made as to whether or not a threshold number of verified values has been stored (step 110). If there are fewer than the threshold number of verified values, then the current reading overwrites the preceding reading in memory (step 112), and the process of storing a current reading (step 102), and comparing the current reading and preceding reading (step 104) begins again.

If the threshold number of verified values has been stored, then an average is taken of the verified values and stored in memory as a reference value for the load cell (step 114). The average may be a median or modal average, but is preferably a mean average.

In preferred embodiments, the threshold number of verified values is 2 or more, more preferably is 5 or more, and most preferably 10 or more. However, in some embodiments only 1 verified value is needed. In these embodiments, steps 110, 112 and 114 are not required, and step 106 is replaced by a step of storing the preceding value as the reference value for the load cell. The threshold number of verified values may also be reconfigurable within the monitoring apparatus depending on the user's needs.

Table 1 provides an example of the readings stored in memory during the process of FIG. 2.

TABLE 1

| Iteration | Preceding Read | Current Read | Preceding Read Accepted? | Verified Values |
|---|---|---|---|---|
| 1 | 9250 | 9253 | YES | 9250 |
| 2 | 9253 | 9989 | NO | 9250 |
| 3 | 9989 | 9249 | NO | 9250 |
| 4 | 9249 | 9251 | YES | 9250, 9249 |
| 5 | 9251 | 9254 | YES | 9250, 9249, 9251 |
| 6 | 9254 | 9251 | YES | 9250, 9249, 9251, 9254 |

In this example, in the first iteration a first reading (9250) is taken from the ADC of the load cell. This reading is temporarily stored in the memory of the monitoring apparatus as the "preceding" reading. A second reading (9253) is then taken from the ADC of the load cell, and is temporarily stored in the memory as the "current" reading. The difference between the preceding reading and the current reading is then compared with the threshold amount, which in this example is 5.

The current reading (9253) differs from the preceding reading (9250) by less than the threshold amount (5), and the preceding reading (9250) is therefore stored in memory as a verified value.

The number of verified values is then compared with the threshold number of verified values required, which in this example is 4. As there is only one verified value (9250), a second iteration begins, with the current read (9253) being stored as the preceding read.

In the second iteration, a third reading (9989) is taken from the ADC of the load cell, and is temporarily stored in the memory as the current reading. The difference between the preceding reading (9253) and the current reading (9989) is again compared with the threshold amount (5).

This time, the current reading (9989) differs from the preceding reading (9253) by more than the threshold amount (5), and the preceding reading (9253) is not stored in memory as a verified reading.

A third iteration of the process then begins, with the current read (9989) being stored as the preceding read. In the third iteration, the preceding reading (9989) is again not stored as a verified value because it differs by more than the threshold amount (5) from the new current reading (9249).

In the fourth, fifth and sixth iterations, the preceding readings are stored as verified values because they differ by less than the threshold amount from the corresponding current reading. The threshold number of verified values (4) have been stored after the sixth iteration, and therefore no further iterations are needed.

Once the threshold number of verified values have been stored, the average of the verified values is calculated and stored as the reference value for the load cell. In this case the averaged verified value, and hence the reference value, is 9251.

The process of FIG. 2 therefore results in a reference value for the load cell which is not affected by the "bad" reading 9989 (as a comparison, the average for all the readings taken in this example would have been 9374, i.e. without removing the "bad" reading, rather than 9251).

As shown in Table 1, the process of FIG. 2 also leads to a "good" reading (9253) being discounted. However, this is considered to be acceptable as the process leads to a more representative reference value being stored.

The process of FIG. 2 is dynamic and, rather than relying on a fixed number of readings that may be severely affected by jitter, the process of the FIG. 2 continues to take reading until the required number of verified readings has been stored.

The process can therefore provide a more representative reference value despite periods of large amounts of jitter.

Figure 3:
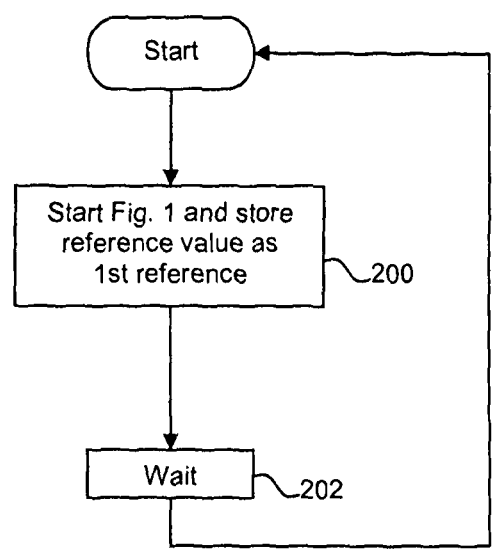
FIG. 3 is a flow diagram illustrating a method of updating the reference reading using the method of FIG. 2.

FIG. 3 illustrates a method of updating the reference reading using the method of FIG. 2. The method begins by performing the method of FIG. 2, with the reference value being stored as a first reference value (step 200).

The monitoring apparatus then waits for a period of time (step 202). The period of time is preferably 20 seconds or more, and most preferably is 45 seconds or more.

When the period of time has elapsed, the method of FIG. 2 is performed again, with the reference value derived from the method of FIG. 2 being stored as the first reference value (step 200). In other words, the first reference value is overwritten or updated. The monitoring apparatus then waits again (step 202).

The process of FIG. 3 accommodates for changes in the reference value caused by drift, by retaining the most recent reference value in memory.

The processes of FIGS. 1 and 2 are performed whilst the drawer of the till is in the closed state. Whilst in the drawer is in the closed state it can be assumed that any changes in the output from the load cells are either due to jitter or drift.

When the till drawer is opened, however, a change in the output from the load cell is more likely to be caused by cash being placed in or taken from the cash drawer. Accordingly, when the monitoring apparatus detects that the drawer has been opened then the process of FIG. 4 begins.

Figure 4:
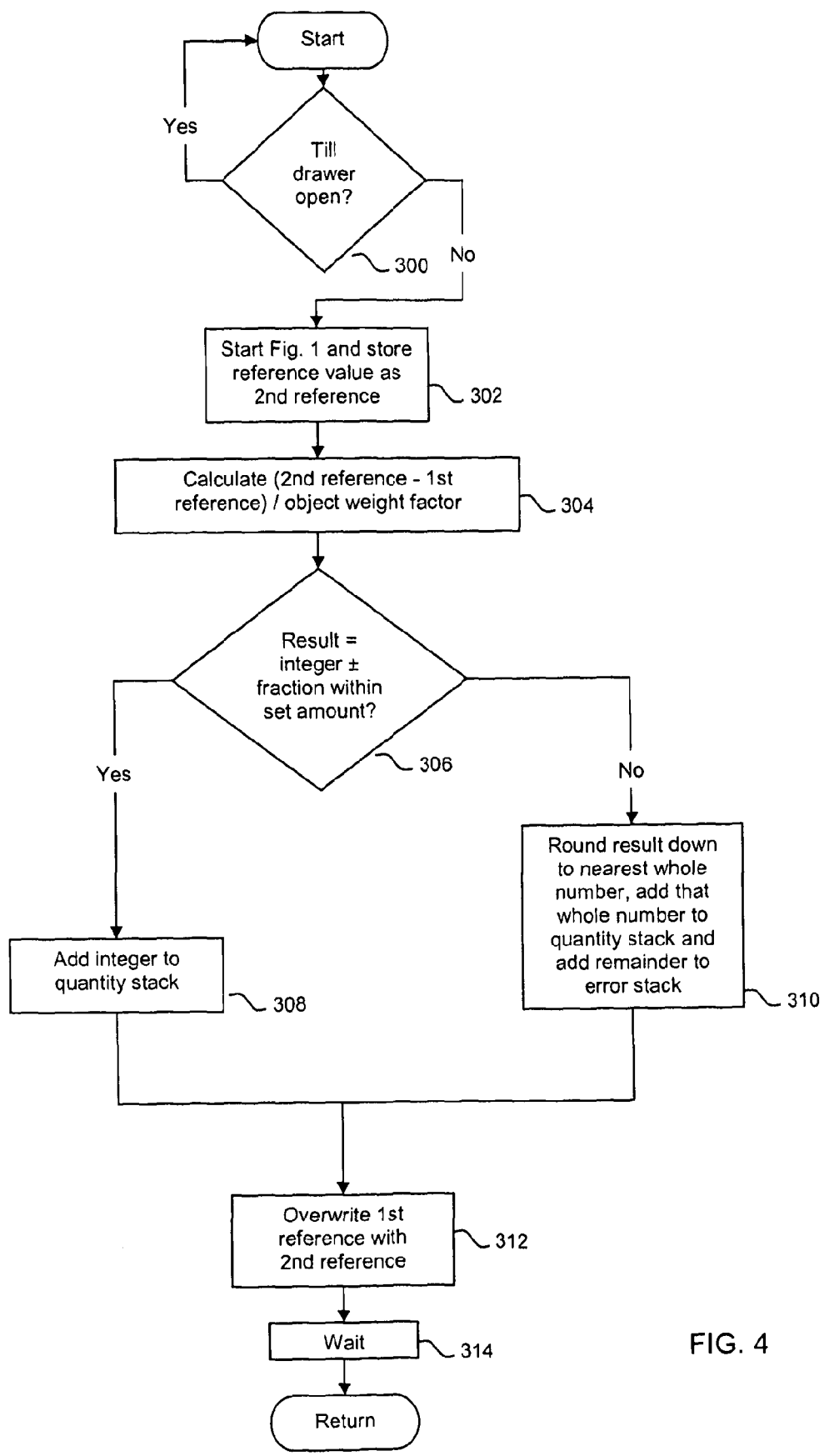
FIG. 4 is a flow diagram illustrating a method of monitoring cash till transactions in accordance with an embodiment of the present invention.

FIG. 4 illustrates a method of the monitoring the cash till transaction which starts when the till drawer is opened. The method begins by determining whether or not the drawer is still open (step 300). If the drawer is still open, then the cash till transaction may not yet be complete. The monitoring apparatus therefore waits for the till drawer to be closed.

When the drawer is closed, the process set out in FIG. 2 is started (step 302), and the resulting reference value is stored as a second reference value.

The first and second reference values are then processed using the following formula to determine the change in the number of objects associated with the compartment of the load cell:

$$\Delta\text{No. of objects} = (\text{2nd ref value} - \text{1st ref value})/\text{object weight factor}$$

with the object weight factor being the change in the digital signal from the ADC of the load cell caused by adding one coin, note or voucher to the compartment to which the load cell relates.

For example, the compartment may be associated with pound coins, and the weight factor (i.e. the known change in the digital signal when £1 is added to the compartment) may be 100.

In the simple situation where the second reference is 9200 and the first reference is 9000, the change in the number of pound coins calculated as being 2. In this situation, £2 can confidently be added to the running total or quantity stack for the compartment for the pound coins.

However, due to variations in the weight of the coins, notes and vouchers, or other objects not specified for the compartment being placed in the compartment, the change in the number of objects will not always be calculated as being a whole number.

In some embodiments; any discrepancies are dealt with simply by rounding to the nearest whole number of objects. However, in preferred embodiments, the size of the discrepancy or error is determined, and the error is dealt with according to its size (step 306).

If the absolute value of the error (i.e. the difference between the nearest integer number of objects and the calculated change in the number of objects) is less than a threshold amount, then the discrepancy is dealt with by rounding to the nearest integer number of objects, and the integer is added to the quantity stack for the compartment (step 308).

If the absolute value of the error is greater than the threshold amount, however, then the discrepancy is dealt with by rounding down to the nearest integer number of objects, that integer is then added to the quantity stack for the compartment, and the error is stored in an "error stack" (step 310).

For example, if the threshold absolute error is 0.3 and the change in the number of objects is calculated as being 1.8 or 2.2, then the change in the number of objects would be taken to be 2 and the error would be ignored. However, if the change in the number of objects is calculated as being 1.6, then the change in the number of objects would be taken to be 1, and 0.6 would be added to the error stack. Equally, if the change in the number of objects is calculated as being 2.4, then the change in the number of objects would be taken to be 2, and 0.4 would be added to the error stack.

In the above example, a threshold "absolute" error of 0.3 is considered. This could also be thought of as defining two fraction error thresholds: one at 0.3 and one at 0.7, with any error below 0.3 being rounded down but otherwise ignored, any error between 0.3 and 0.7 being rounded down and added to the error stack, and any error above 0.7 being rounded up but otherwise ignored.

These fraction error thresholds are symmetrical about the integer value, i.e. one is 0.3 above the integer, and the other is 0.3 below the integer. It will be appreciated; however, that the fraction error thresholds need not be symmetrical about the integer. For example, fraction threshold values of 0.3 and 0.8 could be used, with any error below 0.3 being rounded down but otherwise ignored, any error between 0.3 and 0.8 being rounded down and added to the error stack, and any error above 0.8 being rounded up but otherwise ignored. Thus, in some embodiments, first and second fraction error thresholds, rather than a single absolute error fraction, are used.

The error in the change in the number of coins, notes or vouchers may be due, for example, to a foreign object (e.g. a paperclip that weighs a fraction of a coin or note) being placed in a compartment of the till during a transaction. The above method can be used to remove the error caused by the foreign object.

The step of determining the size of the error at step 306 can also include checking to see in an error on the error stack can be added to the calculated change in the number of objects to remove or reduce the size of the error to below a threshold error size.

For example, when a foreign object is removed from the compartment during a subsequent transaction, the calculated change in the number of objects will be lower than it would otherwise be but by an amount equal to the error caused by the foreign object (and added to the error stack) in the earlier transaction. In this case the error on the error stack due to the foreign object being placed in the compartment can be removed from the error stack and added to the calculated change in the number of objects. If the error in the calculated change in the number of objects can be sufficiently reduced or removed in this way, then the method proceeds to step 308.

Having dealt with the error and added the integer value to the quantity stack at steps 308 or 310, the method continues by overwriting the first reference value with the second reference value (step 312). The updated first reference value can then be used is the till drawer is opened again.

The monitoring apparatus then waits for a period of time (step 314). The period of time is again preferably 20 seconds or more, and most preferably is 45 seconds or more.

If the till drawer is opened again, the method returns to the start of the process of FIG. 4, otherwise the method returns to the start of the process of FIG. 3.

The monitoring apparatus may periodically (e.g. after each opening of the till drawer) compare the total value of the quantity stacks for all the compartments with the transactions that have taken place. If there is larger than a threshold difference between the amount of cash in the till and the amount of cash that should be in the till, then an alert can be provided to the retailer.

The monitoring apparatus may also or instead periodically compare the value of individual quantity stacks to a threshold amount. If there is less than the threshold amount of cash in a quantity, stack for a compartment then an alert can be provided to the retailer that more float is needed.

The monitoring apparatus may also or instead be configured to produce reports detailing the transactions and quantity stacks over time.

The present invention as described above accordingly provides methods and cash tills that can accommodate for jitter and drift in load cell readings. The preferred embodiments can also deal with errors in load cell readings caused by foreign objects being placed in the compartments of cash till and can monitor cash till transactions.

The invention claimed is:

1. A method of reading data from a load cell of a cash till, comprising:
   taking a plurality of readings successively from the load cell;
   comparing a given reading with a subsequently taken reading;
   storing the given reading in memory as a verified value if the subsequently taken reading differs by less than a predetermined amount from the given reading;
   continuing to take successive readings from the load cell and to perform comparisons until a predetermined number of verified values has been stored in memory;
   calculating an average value for the predetermined number of verified values; and
   storing the average value in memory.

2. The method as claimed in claim 1, comprising:
   storing the subsequently taken reading in memory as the given reading after the comparison;
   comparing the given reading with a subsequently taken reading; and
   storing the given reading in memory as a verified value if the subsequently taken reading differs by less than a predetermined amount from the given reading.

3. The method as claimed in claim 1, wherein the predetermined number is 5 or more.

4. The method as claimed in claim 1, the method being performed while the drawer of the cash till remains closed.

5. A method of reading data from a load cell of a cash till, comprising:
   taking a plurality of readings successively from the load cell;
   comparing a given reading with a subsequently taken reading;
   storing the given reading in memory as a verified value if the subsequently taken reading differs by less than a predetermined amount from the given reading;
   performing, a plurality of times, the steps of:
      continuing to take successive readings from the load cell and to perform comparisons until a predetermined number of verified values has been stored in memory;
      calculating an average value for the predetermined number of verified values; and
      storing the average value in memory;
   retaining the most recent average value in memory.

6. The method as claimed in claim 5, wherein the plurality of times are separated from one another by an interval of 20 seconds or longer.

7. A method of monitoring cash till transactions, comprising:
   taking one or more readings from a load cell of the cash till while the drawer of the cash till is in a closed state;
   storing a first load cell value which is derived from the one or more load cell readings in memory;
   identifying that the drawer of the cash till has been opened and subsequently closed;
   taking one or more subsequent readings from the load cell of the cash till responsive to the drawer of the cash till being closed and while the drawer of the cash till is in the closed state;
   storing a second load cell value which is derived from the one or more subsequent load cell readings in memory; and
   determining a difference in the load on the load cell using the first and second stored values
   wherein the first value or the second value is an average value obtained by:
      taking a plurality of readings successively from the load cell;
      comparing a given reading with a subsequently taken reading;
      storing the given reading in memory as a verified value if the subsequently taken reading differs by less than a predetermined amount from the given reading;
      continuing to take successive readings from the load cell and to perform comparisons until a predetermined number of verified values has been stored in memory;
      calculating the average value from the predetermined number of verified values; and
      storing the average value in memory.

8. The method as claimed in claim 7, wherein the load cell relates to a compartment in the cash till for a specific coin, note or voucher, the method comprising:
   determining a change in the number of coins, notes or vouchers in the compartment from the difference in the load on the load cell; and
   adding the change in the number of coins, notes or vouchers to a quantity stack for the compartment.

9. The method as claimed in claim 8, comprising:
   determining the change in the number of coins, notes or vouchers in the compartment by dividing the difference between the second and first stored values by a load cell weight factor attributed to the specific coin, note or voucher.

10. The method as claimed in claim 7, comprising:
   comparing the monetary value of the change in the number of coins, notes or vouchers to the monetary value of any till transactions that have occurred between the one or more readings and the subsequent one or more readings; and
   providing an alert if the monetary value of the change in the number of coins, notes or vouchers differs from the monetary value of the till transactions by more than a threshold amount.

11. The method as claimed in claim 7, comprising:
comparing a value stored in a quantity stack to a threshold amount; and
providing an alert if the value stored in the quantity stack is less than the threshold amount.

12. A method of monitoring cash till transactions, comprising:
taking one or more readings from a load cell of the cash till while the drawer of the cash till is in a closed state;
storing a first load cell value which is derived from the one or more load cell readings in memory;
identifying that the drawer of the cash till has been opened and subsequently closed;
taking one or more subsequent readings from the load cell of the cash till responsive to the drawer of the cash till being closed and while the drawer of the cash till is in the closed state;
storing a second load cell value which is derived from the one or more subsequent load cell readings in memory; and
determining a difference in the load on the load cell using the first and second stored values;
wherein the load cell relates to a compartment in the cash till for a specific coin, note or voucher, the method comprises:
determining a change in the number of coins, notes or vouchers in the compartment from the difference in the load on the load cell; and
adding the change in the number of coins, notes or vouchers to a quantity stack for the compartment;
wherein the method further comprises determining the change in the number of coins notes or vouchers in the compartment by dividing the difference between the second and first stored values by a load cell weight factor attributed to the specific coin, note or voucher; and
wherein the division results in a number consisting of an integer plus a fraction of the specific coin, note or voucher, and the change in the number of coins, notes or vouchers is determined to be:
if the fraction is less than a first threshold value, the integer, or
if the fraction is greater than the first threshold value, the integer plus one.

13. The method as claimed in claim 12, wherein the first value or the second value is a verified value obtained by:
taking a plurality of readings successively from the load cell;
comparing a given reading with a subsequently taken reading; and
storing the given reading in memory as a verified value if the subsequently taken reading differs by less than a predetermined amount from the given reading.

14. The method as claimed in claim 12, wherein:
if the fraction is less than the first threshold value, but greater than a second threshold value, then the fraction is added to an error stack as an error fraction.

15. A method of monitoring cash till transactions, comprising:
taking one or more readings from a load cell of the cash till while the drawer of the cash till is in a closed state;
storing a first load cell value which is derived from the one or more load cell readings in memory;
identifying that the drawer of the cash till has been opened and subsequently closed;
taking one or more subsequent readings from the load cell of the cash till responsive to the drawer of the cash till being closed and while the drawer of the cash till is in the closed state;
storing a second load cell value which is derived from the one or more subsequent load cell readings in memory; and
determining a difference in the load on the load cell using the first and second stored values;
wherein the load cell relates to a compartment in the cash till for a specific coin, note or voucher, the method comprises:
determining a change in the number of coins, notes or vouchers in the compartment from the difference in the load on the load cell; and
adding the change in the number of coins, notes or vouchers to a quantity stack for the compartment;
wherein the method further comprises
determining the change in the number of coins, notes or vouchers in the compartment by dividing the difference between the second and first stored values by a load cell weight factor attributed to the specific coin, note or voucher;
removing an error fraction from an error stack if the error fraction, when added to the result of the division, would give an integer plus a fraction where:
the fraction is greater than a first threshold value, or
the fraction is less than a second threshold value; and
determining that the change in the number of coins, notes or vouchers is:
if the fraction is less than the second threshold value, the integer, or
if the fraction is greater than the first threshold value, the integer plus one.

* * * * *